United States Patent
Qu et al.

(10) Patent No.: US 8,799,422 B1
(45) Date of Patent: *Aug. 5, 2014

(54) IN-SERVICE CONFIGURATION UPGRADE USING VIRTUAL MACHINE INSTANCES

(75) Inventors: Hui Qu, Santa Clara, CA (US); Joel Obstfeld, Bushey (GB); David Ward, Los Gatos, CA (US); Mu Lin, Sunnyvale, CA (US); Anjali Kulkarni, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/247,475

(22) Filed: Sep. 28, 2011

Related U.S. Application Data

(63) Continuation-in-part of application No. 12/857,207, filed on Aug. 16, 2010.

(51) Int. Cl.
*G06F 15/177* (2006.01)
(52) U.S. Cl.
USPC ............ 709/220; 709/221; 709/222; 709/223
(58) Field of Classification Search
USPC ....................................... 718/1; 709/220–223
See application file for complete search history.

(56) References Cited

U.S. PATENT DOCUMENTS

| | | | |
|---|---|---|---|
| 6,795,966 B1 | 9/2004 | Lim et al. | |
| 7,003,692 B1 | 2/2006 | Banks et al. | |
| 7,275,081 B1 | 9/2007 | Katz et al. | |
| 7,359,377 B1 * | 4/2008 | Kompella et al. | 370/389 |
| 7,739,403 B1 | 6/2010 | Balakrishna et al. | |
| 7,804,769 B1 * | 9/2010 | Tuplur et al. | 370/218 |
| 7,814,495 B1 * | 10/2010 | Lim et al. | 718/104 |
| 7,814,995 B2 * | 10/2010 | Clausen et al. | 175/297 |
| 8,055,933 B2 | 11/2011 | Jaehde et al. | |
| 8,166,474 B1 * | 4/2012 | Delco et al. | 718/1 |
| 8,190,720 B1 | 5/2012 | Yellai et al. | |
| 8,234,429 B2 * | 7/2012 | Serebrin | 710/260 |
| 8,245,217 B2 | 8/2012 | Raman et al. | |
| 8,291,258 B2 | 10/2012 | Narayanaswamy et al. | |

(Continued)

OTHER PUBLICATIONS

U.S. Appl. No. 12/182,619 entitled Streamlined Packet Forwarding Using Dynamic Filters for Routing and Security in a Shared Forwarding Plane, filed Jul. 30, 2008.

(Continued)

*Primary Examiner* — Jason K. Gee
*Assistant Examiner* — Sanchit Sarker
(74) *Attorney, Agent, or Firm* — Shumaker & Sieffert, P.A.

(57) ABSTRACT

Techniques described in this disclosure relate to configuration updates, such as performing an in-service software upgrade on a device, using virtual machines. In a routing device, a routing engine utilizes a virtual machine executing on a hypervisor to provide control plane functions. In one example, an in-service software upgrade may be performed between a first virtual machine and a second virtual machine without a managing virtual machine. More specifically, a first virtual machine in the control plane of the router may control the upgrade process, including requesting initialization of the second virtual machine, installing a new software system on the second virtual machine, and replicating state data from the first virtual machine to the second virtual machine. In this example, the first virtual machine may operate as a master virtual machine and the second virtual machine may operate as a slave virtual machine that synchronizes with the master virtual machine.

24 Claims, 10 Drawing Sheets

(56) References Cited

U.S. PATENT DOCUMENTS

| | | | |
|---|---|---|---|
| 8,352,558 | B2 | 1/2013 | Boctor et al. |
| 8,495,618 | B1 | 7/2013 | Inbaraj et al. |
| 8,639,814 | B2* | 1/2014 | Jung et al. .................. 709/226 |
| 2002/0073135 | A1* | 6/2002 | Meyer ........................ 709/107 |
| 2004/0042395 | A1* | 3/2004 | Lu et al. ..................... 370/225 |
| 2005/0289540 | A1* | 12/2005 | Nguyen et al. ................ 718/1 |
| 2006/0233182 | A1 | 10/2006 | Appanna et al. |
| 2007/0083723 | A1 | 4/2007 | Dey et al. |
| 2007/0169083 | A1 | 7/2007 | Penubolu et al. |
| 2007/0255764 | A1 | 11/2007 | Sonnier et al. |
| 2008/0034365 | A1 | 2/2008 | Dahlstedt |
| 2008/0244552 | A1 | 10/2008 | Toeroe |
| 2008/0244577 | A1 | 10/2008 | Le et al. |
| 2009/0089774 | A1 | 4/2009 | Lynch et al. |
| 2009/0100418 | A1 | 4/2009 | Raman et al. |
| 2009/0150527 | A1* | 6/2009 | Tripathi et al. ............... 709/221 |
| 2009/0150529 | A1* | 6/2009 | Tripathi ...................... 709/222 |
| 2009/0327648 | A1* | 12/2009 | Savagaonkar et al. ........ 711/207 |
| 2010/0057843 | A1* | 3/2010 | Landsman et al. ........... 709/203 |
| 2010/0107158 | A1 | 4/2010 | Chen et al. |
| 2010/0115512 | A1* | 5/2010 | Sakai ............................ 718/1 |
| 2010/0306770 | A1* | 12/2010 | Frank ............................ 718/1 |
| 2011/0138441 | A1* | 6/2011 | Neystadt et al. ................. 726/1 |
| 2011/0158088 | A1* | 6/2011 | Lofstrand et al. ............ 370/229 |
| 2011/0173490 | A1 | 7/2011 | Narayanaswamy et al. |
| 2012/0011509 | A1* | 1/2012 | Husain ........................... 718/1 |
| 2012/0017212 | A1* | 1/2012 | Twitchell ........................ 718/1 |
| 2012/0072893 | A1 | 3/2012 | Gupta et al. |
| 2012/0084414 | A1* | 4/2012 | Brock et al. ................. 709/221 |
| 2012/0166625 | A1* | 6/2012 | Suit .............................. 709/224 |
| 2012/0185914 | A1* | 7/2012 | Delco et al. ..................... 726/1 |
| 2013/0042323 | A1 | 2/2013 | Narayanaswamy et al. |
| 2013/0086236 | A1* | 4/2013 | Baucke et al. ............... 709/223 |
| 2013/0145359 | A1 | 6/2013 | Hanselmann |
| 2013/0191340 | A1 | 7/2013 | Ammanur et al. |

OTHER PUBLICATIONS

Chandra et al. "Capabilities Advertisement with BGP-4", RFC 2842, Network Working Group, May 2000, 4pgs.

U.S. Appl. No. 12/857,207, entitled Configuration Update on Virtual Control Plane, filed Aug. 16, 2010.

Office Action from US. Appl. No. 12/857,207 dated Nov. 29, 2013, 16 pp.

Response filed Feb. 28, 2014 to the Final Office Action mailed Nov. 29, 2013 and the Advisory Action mailed Feb. 13, 2014 in U.S. Appl. No. 12/857,207, 13 pgs.

Advisory Action mailed Feb. 13, 2014 in U.S. Appl. No. 12/857,207, 3 pgs.

Response filed Jan. 29, 2014 in U.S. Appl. No. 12/857,207, 15 pgs.

* cited by examiner

IN-SERVICE CONFIGURATION UPGRADE USING VIRTUAL MACHINE INSTANCES

This application is a continuation-in-part of application Ser. No. 12/857,207 filed Aug. 16, 2010, the entire contents of which are incorporated herein by reference.

TECHNICAL FIELD

Techniques of this disclosure relate generally to computer networks, and more particularly to a configuration update mechanism for network devices.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, contain routing engines that maintain routing information describing routes through the network. Each route defines a path between locations on the network. From the routing information, a forwarding engine of the routers generates forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" via which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or to indicate routes that are no longer available.

Periodically, routers may need to be updated. For example, the software running on the routers may need to be upgraded or downgraded. A router, however, may not be able to simultaneously install the software update, maintain a routing session, and forward incoming packets. Many problems associated with a router going offline because of failure may also occur if the router has to go offline to process a software update. For example, in the event that one of the routers participating in a routing communication session detects a failure of that session, which is caused by a remote router performing a software update, the non-failed router may select one or more alternative routes through the network to avoid the failed remote router while the failed remote router processes the software update. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information cause significant problems, including intermittent loss of network connectivity and increased packet loss and latency.

SUMMARY

In general, techniques described in this disclosure relate to configuration updates, such as performing an in-service software upgrade on a device, using virtual machines. In a routing device or network appliance, such as a router or switch, a routing engine utilizes a virtual machine executing on a hypervisor, instead of running directly on top of the hardware, to provide control plane functions. This makes it possible for multiple instances of operating systems to run simultaneously on the same hardware. When an in-service software upgrade is required, therefore, a second virtual machine may be instantiated having an updated version of the software, and control plane routing functionality may be switched from the first virtual machine to the second virtual machine.

In one example, through the hypervisor, a managing virtual machine creates and controls access to a first virtual machine. The routing device or network appliance comprises a plurality of software processes in the control plane that manage the routing control operations of the device. The first virtual machine runs a first software system to control a routing communication session between the router and other routers on a network. To install a second software system, such as an upgraded version of the operating system, a user of the device sends an update request to the device through the managing virtual machine. In response to the user request, the managing virtual machine issues a call to the hypervisor to initialize a second virtual machine. After loading a second software system onto the second virtual machine, state information maintained by the managing virtual machine can be transferred to the second virtual machine. The second virtual machine, with the upgraded software system, then takes control of the routing communication session.

The first virtual machine may maintain forwarding state information during the switchover, enabling the router to continue forwarding packets over routes that were available in the network's last-known state. Concurrently, to the extent necessary, the second virtual machine can learn the network topology by receiving routing protocol updates from neighboring routers and calculate its routing information and forwarding information. As a result, impact on current packet flows through the network may be reduced. During the switchover from the first virtual machine to the second virtual machine, techniques of "non-stop forwarding" and "graceful restart" may be implemented to minimize the effect the switchover has on the network. After completing the switchover to the second virtual machine, the managing virtual machine shuts down the first virtual machine.

In a second example, an in-service software upgrade may be performed between a first virtual machine and a second virtual machine without a managing virtual machine. More specifically, a first virtual machine in the control plane of the router may control the upgrade process, including requesting initialization of the second virtual machine, installing a new software system on the second virtual machine, and replicating state data from the first virtual machine to the second virtual machine. In this example, the first virtual machine may operate as a master virtual machine and the second virtual machine may operate as a slave virtual machine that synchronizes with the master virtual machine. In this case, the processing code for managing the in-service software upgrade may be included in the operating systems on the first and second virtual machines, rendering the management virtual machine unnecessary.

In one example, a method comprises on a routing component of a network device running a first virtual machine executing a first software system, wherein the first software system controls a routing communication session between the network device and a second network device; in response to receiving an in-service configuration update (ISCU) request, initializing a second virtual machine on the routing component; on the second virtual machine, installing a second software system; after installing the second software system, transferring control of the routing communication session from the first virtual machine to the second virtual machine. The method also comprises wherein the first software system comprises a first version of an operating system for the network device and the second software system comprises a second version of the operating system. The method also comprises receiving the ISCU request with a managing virtual machine of the network device separate from the first virtual machine; and in response to receiving the ISCU request, the managing virtual machine: replicating state data from the first virtual machine; and storing the replicated state data.

The method also comprises transferring control of the routing communication session from the first virtual machine to the second virtual machine comprising loading state data of the first virtual machine associated with the routing communication session onto the second virtual machine. The method also comprises after transferring control of the routing communication session, shutting down the first virtual machine. The method also comprises transferring control of the routing communication session comprising performing a graceful restart operation. The method also comprises on the routing component, running a management virtual machine, wherein the management virtual machine communicates with the first virtual machine and the second virtual machine through a communication backbone. The method also comprises in response to receiving the ISCU request, advertising capability information to the second network device. The method also comprises the capability information indicating the network device supports graceful restart. The method also comprises the capability information indicating the network device supports non-stop forwarding. The method also comprises while transferring control of the routing communication session from the first virtual machine to the second virtual machine, forwarding a data packet form the network device to the second network device.

In another example, a network device comprises a routing component; a first virtual machine running on the routing component, wherein the first virtual machine is configured to execute a first software system, and wherein the first software system controls a communication session between the network device and a second network device; a second virtual machine running on the routing component; a managing virtual machine (MVM) running on the routing component, wherein the MVM is configured to install a second software system onto the second virtual machine and transfer control of the routing communication session from the first virtual machine to the second virtual machine. The network device also comprises the first software system comprising a first version of an operating system for the network device and the second software system comprising a second version of the operating system. The network device also comprises the MVM being further configured to: receive an in-service configuration update (ISCU) request; initialize the second virtual machine; replicate state data from the first virtual machine; store the replicated state data.

The network device also comprises the MVM being further configured to: load state data of the first virtual machine associated with the routing communication session onto the second virtual machine. The network device also comprises the MVM being further configured to shut down the first virtual machine. The network device also comprises the network device being configured to perform a graceful restart operation while transferring control of the routing communication session from the first virtual machine to the second virtual machine. The network device also comprises the MVM communicating with the first virtual machine and the second virtual machine through a communication backbone. The network device also comprises the MVM being further configured to in response to receiving the ISCU request, cause capability information to be advertised to the second network device. The network device also comprises the capability information indicating the network device supports graceful restart. The network device also comprises the capability information indicating the network device supports non-stop forwarding. The network device also comprises a forwarding component, wherein the forwarding component is configured to forward a data packet from the network device to the second network device while the MVM transfers control of the routing communication session from the first virtual machine to the second virtual machine.

In another example, a non-transitory, computer-readable storage medium comprises instructions that cause one or more programmable processors to: on a routing component of a network device running a first virtual machine, execute a first software system, wherein the first software system controls a routing communication session between the network device and a second network device; in response to receiving an in-service configuration update (ISCU) request, initialize a second virtual machine on the routing component; on the second virtual machine, install a second software system; after installing the second software system, transfer control of the routing communication session from the first virtual machine to the second virtual machine. The non-transitory, computer-readable storage medium also comprises the first software system comprising a first version of an operating system for the network device and the second software system comprising a second version of the operating system. The non-transitory, computer-readable storage medium also comprises further instructions that cause one or more programmable processors to: in response to receiving the ISCU request, cause the managing virtual machine to: replicate state data from the first virtual machine; and store the replicated state data.

The non-transitory, computer-readable storage medium also comprises wherein transferring control of the routing communication session from the first virtual machine to the second virtual machine comprises loading state data of the first virtual machine associated with the routing communication session onto the second virtual machine. The non-transitory, computer-readable storage medium also comprises further instructions that cause one or more programmable processors to after transferring control of the routing communication session, shut down the first virtual machine. The non-transitory, computer-readable storage medium also comprises wherein transferring control of the routing communication session comprises performing a graceful restart operation. The non-transitory, computer-readable storage medium also comprises further instructions that cause one or more programmable processors to, on the routing component, run a management virtual machine, wherein the management virtual machine communicates with the first virtual machine and the second virtual machine through a communication backbone. The non-transitory, computer-readable storage medium also comprises further instructions that cause one or more programmable processors to in response to receiving the ISCU request, advertise capability information to the second network device. The non-transitory, computer-readable storage medium also comprises the capability information indicating the network device supports graceful restart. The non-transitory, computer-readable storage medium also comprises the capability information indicating the network device supports non-stop forwarding. The non-transitory, computer-readable storage medium also comprises further instructions that cause one or more programmable processors to while transferring control of the routing communication session from the first virtual machine to the second virtual machine, forward a data packet form the network device to the second network device.

In a further example, a method comprises, on a routing component of a network device, running a first virtual machine executing a first software system that controls a routing communication session between the network device and a second network device, wherein the first software system controls an in-service configuration update (ISCU) of the routing component. The method also comprises, in response to receiving an ISCU request with the first virtual machine, initializing a second virtual machine on the routing component, installing a second software system on the second virtual machine, wherein the second software system is different than the first software system, and transferring control of the routing communication session from the first virtual machine to the second virtual machine.

In another example, a network device comprises a routing component and a first virtual machine running on the routing component, wherein the first virtual machine is configured to execute a first software system, wherein the first software system controls a communication session between the network device and a second network device, and an in-service configuration update (ISCU) of the routing component. The network device also comprises a second virtual machine running on the routing component, wherein, in response to receiving an ISUC request, the first virtual machine requests initialization of the second virtual machine on the routing component, requests installation of a second software system on the second virtual machine, wherein the second software system is different than the first software system, and transfers control of the routing communication session from the first virtual machine to the second virtual machine.

The techniques described in this disclosure may provide one or more advantages. For example, the techniques may reduce interruptions caused by software upgrades and other configuration updates, thus improving overall network service. The techniques of copying a disk image onto a newly created virtual machine may also be less computationally expensive than reconfiguring an already running version of a software system. Additionally, the techniques of this disclosure may enable in-service configuration updates to be performed on devices without redundant control plane hardware. On systems with redundant control plane hardware, the techniques of this disclosure may enable an in-service configuration update to be performed without risking a switchover from a primary routing unit to a secondary routing unit.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
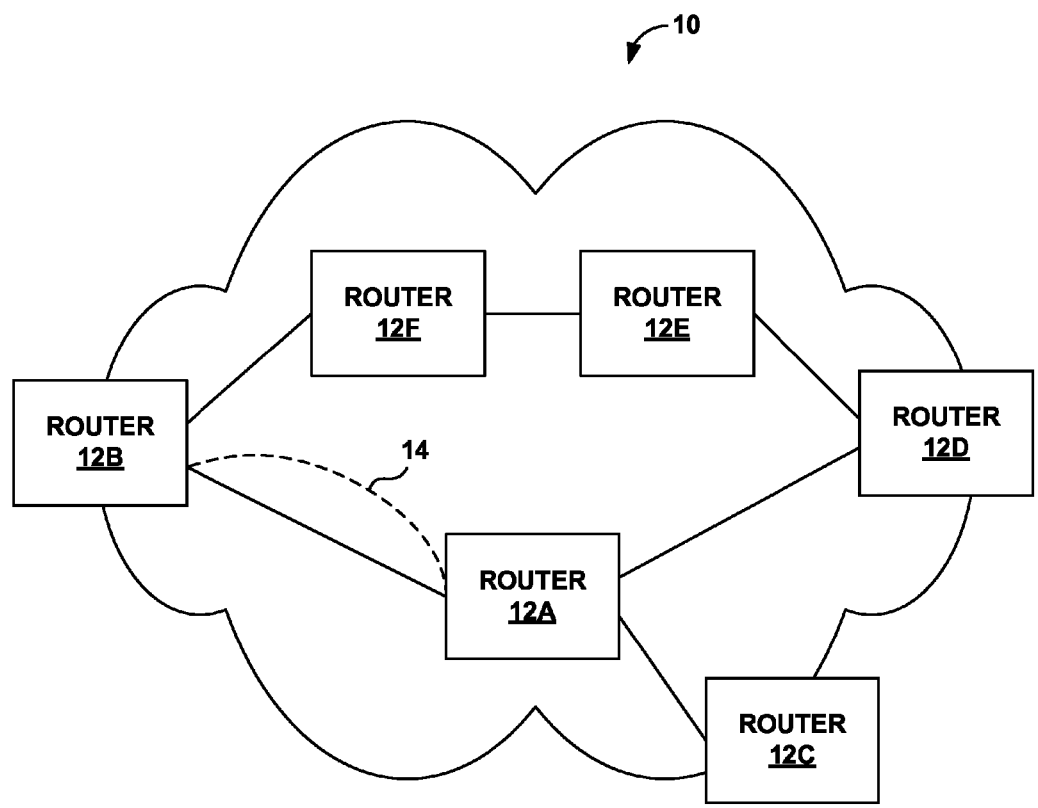
FIG. 1 is a block diagram illustrating an example network comprising one or more routers configured to execute techniques described in this disclosure.

FIG. 1 is a block diagram illustrating an example network 10 in which one or more of routers 12A-12F ("routers 12") exchange routing information with each other to maintain an updated view of the topology of network 10. For example, router 12A receives a packet from router 12C, and based on routing information maintained by router 12A, forwards the packet to a next hop, such as router 12B over path 14. The configuration update techniques described in this disclosure enable router 12A to process a configuration update without disruption to the forwarding being performed by router 12A. Examples of configuration updates that may be performed on router 12A include upgrading or replacing the operating system, adding support for new routing protocols, adding support for new features, fixing bugs without shutting down (sometimes called hotspot bug fixing), saving/restoring routing states, taking a snapshot of routing states at a particular point in time, restoring a routing session based on a snapshot, and restarting routing machines.

Techniques disclosed include performing in-service configuration updates, where the device being update remains in service during the update process. In the example above, for instance, router 12A could simultaneously process an operating system upgrade and still continue to forward incoming packets to other routers 12B-12F on the network 10. For purposes of explanation this disclosure describes in-service configuration updates being applied to routers, but the techniques of the present disclosure may also be applied in other contexts such as to network devices other than routers.

In the example of FIG. 1, a control plane of router 12A is configured to implement the techniques disclosed and includes a plurality of software processes that manage routing control operations and other functionality of the device. In one example, through a hypervisor in the control plane, a managing virtual machine controls access to a first virtual machine. The first virtual machine runs a first software system, such as a first operating system and user-level applications, to control routing communication sessions between router 12A and other routers 12B-12F on network 10. In order to install a second software system, such as an upgraded version of the operating system, on router 12A, a user typically sends an update request to router 12A (e.g., either remotely or by way of a command line interface), and in response to the update request, the managing virtual machine initializes (i.e., creates) a second virtual machine on router 12A. After loading the second software system onto the second virtual machine, the managing virtual machine transfers state information, maintained by the managing virtual machine, to the second virtual machine. The second virtual machine, with the upgraded software system, then takes control of the routing communication session.

In a second example, an in-service software upgrade may be performed between a first virtual machine and a second virtual machine without a managing virtual machine. More specifically, a first virtual machine in the control plane of router 12A may control the upgrade process, including requesting initialization of the second virtual machine, installing a new software system on the second virtual machine, and replicating state data from the first virtual machine to the second virtual machine. In this example, the first virtual machine may operate as a master virtual machine and the second virtual machine may operate as a slave virtual machine that synchronizes with the master virtual machine. In this case, the processing code for managing the in-service software upgrade may be included in the operating systems on the first and second virtual machines, rendering the management virtual machine unnecessary.

During the switchover from the first virtual machine to the second virtual machine, techniques of "non-stop forwarding" and "graceful restart" may be implemented by router 12A to minimize the effect the switchover has on the network 10. For example, while installing the upgraded software system on the second virtual machine and during the switchover from the first virtual machine to the second virtual machine, router 12A continues to receive packets from other routers, such as router 12C, and based on routing information maintained by router 12A, continues forwarding the packets to next hops, such as router 12B over path 14. After completing the switchover to the second virtual machine, the managing virtual machine shuts down the first virtual machine. Further details of non-stop forwarding are described in U.S. patent application Ser. No. 11/292,204, filed December 1, the entire contents of which are incorporated by reference herein. Further details of graceful restart are described in U.S. Pat. No. 7,359,377, issued Apr. 15, 2008, the entire contents of which are incorporated by reference herein.

Figure 2:
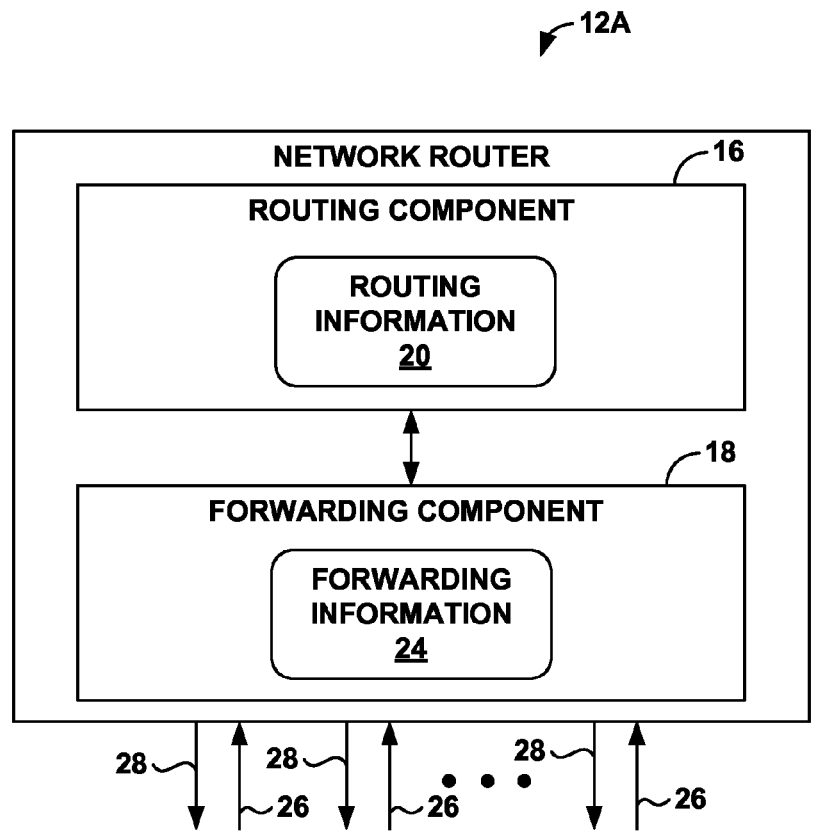
FIG. 2 is a block diagram illustrating functional components of a router implementing techniques described in this disclosure.

FIG. 2 is a block diagram illustrating functional components of a router, such as router 12A of FIG. 1, configured to execute configuration updates according to the techniques of this disclosure. In this example, router 12A comprises a routing component 16 and a forwarding component 18. Routing component 16 and forwarding component 18 receive and send information to network 10 via communication links 26 and 28, respectively. Communication links 26, 28 may be coupled to one or more physical interface cards of router 12A (not shown).

Routing component 16 implements one or more routing protocols to establish at least one routing communication session with neighboring routers, such as the session corresponding to path 14 between router 12A and router 12B for example, in order to exchange capability information as well as routing information. In addition, router 12A and router 12B exchange routing information with one another in order to learn routes through network 10. Based on the learned routing information, routing component 16 maintains and updates routing information 20 to describe a topology of network 10, and more particularly, routes through network 10.

Routing component 16 analyzes its stored routing information 20 and generates forwarding information 24 for forwarding component 18. Forwarding information 24 may associate, for example, network destinations with specific next hops. Forwarding component 18 forwards network traffic via communication links 26 and 28 in accordance with forwarding information 24 generated by routing component 16. Forwarding component 18 may comprise a forwarding engine that is responsible for the forwarding functionality of router 12A. Alternatively, the forwarding component 18 may distribute the forwarding functionality within one or more interface cards (IFCs).

When establishing the session corresponding to path 14, routers 12A and 12B may exchange information that indicates particular routing protocol capabilities supported by each of the routers. For example, routing component 16 may send capability information to router 12B via path 14 that indicates router 12A supports, for example, graceful restart, non-stop forwarding, dynamic renegotiation, and any other routing capabilities that router 12A supports. Similarly, router 12B sends capability information to router 12A indicating its capabilities, such as support of graceful restart, non-stop forwarding, and dynamic renegotiation. In this manner, routers 12 are aware of the capabilities of neighboring routers, and may adjust their interactions accordingly. For example, after router 12A informs neighboring router 12B of its capabilities, if neighboring router 12B detects that router 12A is non-responsive, router 12B may wait before tearing down the routing session between them because router 12B knows router 12A supports graceful restart or another capability.

In some aspects, upon instantiating a second virtual machine on router 12A (e.g., to begin an in-service configuration update), router 12A may inform neighboring routers 12 of certain new capabilities that router 12A supports based on the availability of the second virtual machine, which will be configured to operate as a second virtual routing engine. Examples of new capabilities that may be advertised by router 12A include graceful restart and non-stop forwarding. In addition, when switchover to the second virtual routing engine concludes and the first virtual routing engine is taken down, router 12A may indicate to routers 12 that the capabilities are no longer supported by router 12A. Further details of capabilities advertisements are described in R. Chandra, et. al., "Capabilities Advertisement with BGP-4," RFC 2842, May 2000, the entire contents of which are incorporated by reference herein.

While routing component 16 performs a switchover from a first virtual routing engine to a second virtual routing engine, another router on the network such as router 12B may detect router 12A as being non-responsive. Based on the capability information broadcast by routing component 16, however, router 12B may continue forwarding packets to router 12A even after detecting router 12A as being non-responsive. During the switchover, forwarding component 18 continues to forward incoming packets to next hop routers, such as router 12D, in the same manner as prior to routing component 16 initiating the switchover from the first virtual routing engine to the second virtual routing engine.

Although routing component 16 may comprise redundant hardware, such as a primary routing unit and a secondary routing unit, each comprising a separate processor, techniques described in this disclosure do not require redundant hardware to perform an in-service configuration update. In an embodiment where routing component 16 comprises redundant hardware, an in-service configuration update may be performed, for example, by initiating multiple virtual machines solely within the hardware of the primary routing unit. Performing the in-service configuration update solely within the primary routing unit avoids risks involved with switchover from the primary routing unit to the secondary routing unit and avoids making a successful update contingent upon the secondary routing unit functioning properly.

Figure 3A:
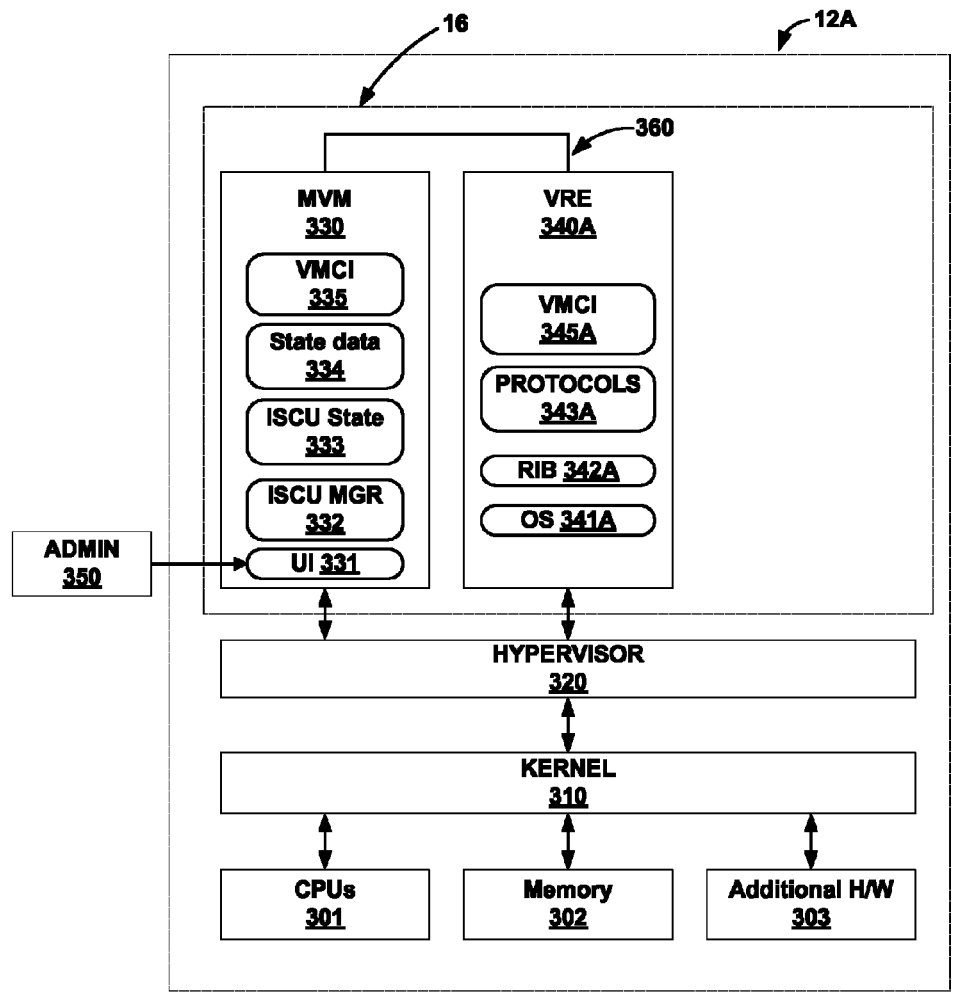
FIGS. 3A-3C are block diagrams showing various hardware components and software processes of a router at different stages of an in-service configuration update.
Figure 3B:
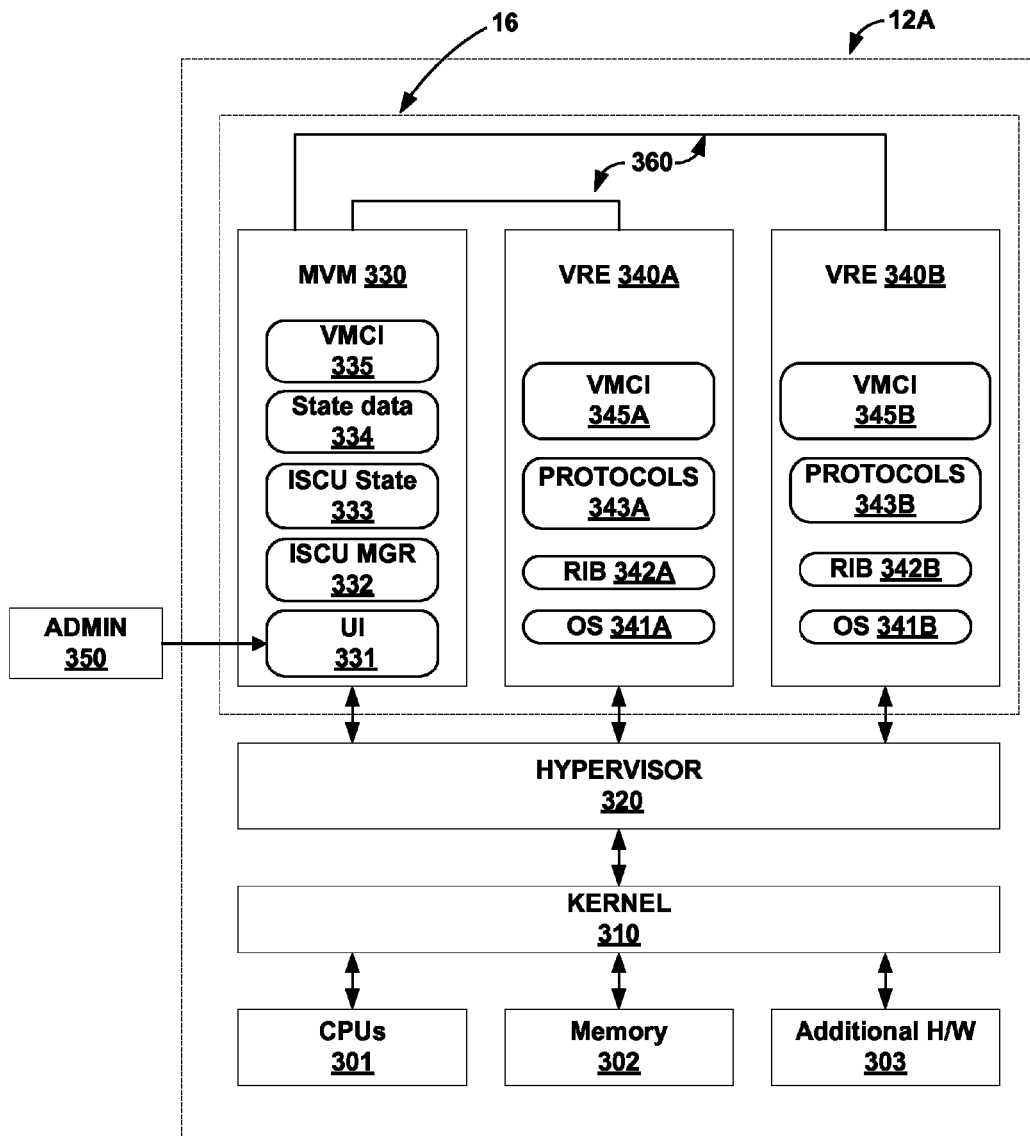
Figure 3C:
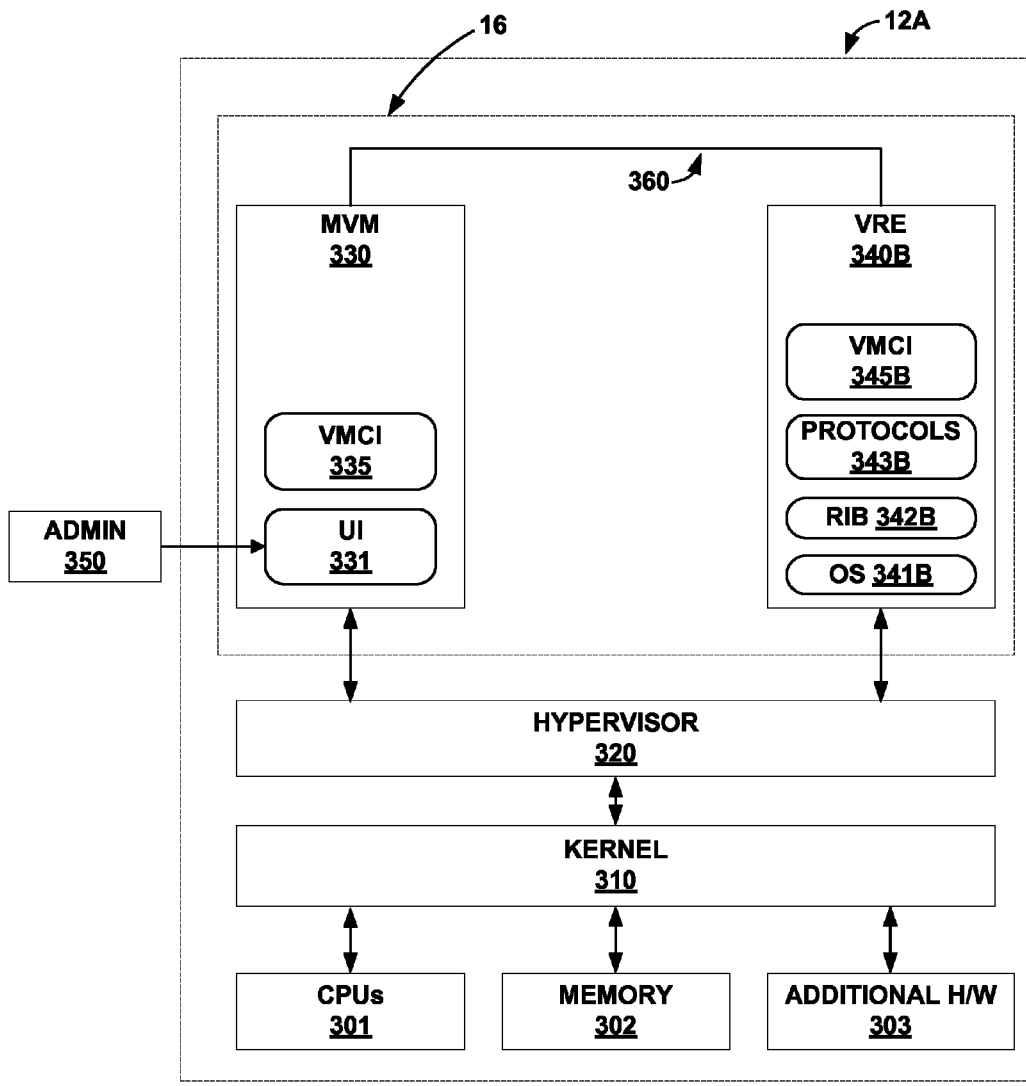

FIGS. 3A-3C are block diagrams showing various hardware components and software processes of the same router 12A shown in FIG. 2, at different stages of an in-service configuration update. FIG. 3A shows router 12A comprising a first virtual routing engine (VRE) 340A configured to control a routing session. FIG. 3B shows router 12A while the in-service configuration update is in progress, comprising VRE 340A and a second virtual machine, VRE 340B. VRE 340A may, for example, control a routing session while upgraded software is loaded on to VRE 340B. FIG. 3C shows router 12A after the in-service configuration update is completed, comprising only VRE 340B. That is, after the upgraded software is loaded onto VRE 340B and control of the routing session has been transferred from VRE 340A to VRE 340B, VRE 340A has been shut down.

Block 16 of FIGS. 3A-3C comprises the functionality described in relation to the routing component 16 of FIG. 2. The router 12A comprises one or more central processing units (CPUs) 301 configured to execute instructions fetched from memory 302, which may comprise one or more computer-readable media, such as a non-transitory, computer-readable storage media. Examples of such media include random access memory (RAM), read-only memory (ROM), non-volatile random access memory (NVRAM), electrically erasable programmable read-only memory (EEPROM), flash memory, and other computer-readable storage media. The router 12A further comprises additional hardware 303 ("additional H/W 303") such as discrete hardware circuitry, application-specific integrated circuits (ASICS), and input/output devices. A kernel 310 of an operating system manages the physical resources of the router 12A. The forwarding component 18 described in relation to FIG. 2, for example, may be either fully or partially incorporated into the additional hardware 303 of FIGS. 3A-3C.

Through a hypervisor 320 running on top of a kernel 310, router 12A has the capability to concurrently run a plurality of virtual machines 330, 340A-340B, each with its own unique operating system. The hypervisor 320 may, for example, be a proprietary program such as VMWARE® or an open source solution. The plurality of virtual machines 330, 340A-340B includes a managing virtual machine (MVM) 330. The MVM 330 may have a master/slave relationship with the other virtual machines 340A-340B ("virtual machines 340") and have access privileges to the other virtual machines 340. The virtual machines 330, 340 communicate with one another through a communication backbone 360, such as LIBVIRT. Users access virtual machines 340 by logging into the MVM 330. MVM 330 controls the communication between the virtual machines 330, 340 and receives input from an administrator 350 through a user interface (UI) 331. Although for purposes of explanation FIGS. 3A-3C show MVM 330 and hypervisor 320 as being separate modules, in some embodiments, some or all of the functionality of MVM 330 is integrated into the hypervisor 320. MVM 330 and VREs 340 may communicate through a Virtual Machine Communication Interface (VMCI) over communication backbone 360. MVM 330 may establish a communication channel through the VMCI between VMCI module 335 ("VMCI 335") of MVM 330 and VMCI module 345A ("VMCI 345A") of VRE 340A. A standard set of messages may be defined for communication between VMCI modules 335, 345A in accordance with a communication protocol. For example, the messages may include instructions requesting more memory, assigning memory, and releasing memory.

In the example of FIG. 3A, router 12A comprises VRE 340A. VRE 340A runs a first operating system 341A, such as a version of a network operating system. VRE 340A provides an operating environment for execution of protocols 343A. Protocols 343A may include, for example, routing protocols, tunneling protocols, and label switching protocols, such as Border Gateway Protocol (BGP), Intermediate System-to-Intermediate System (IS-IS), Resource Reservation Protocol with Traffic Engineering extensions (RSVP-TE) and Label Distribution Protocol (LDP), or other protocols. Router 12A uses protocols 343A to perform a variety of functions, such as to exchange routing information, to establish Virtual Private Networks (VPNs), Label Switched Paths (LSPs), and for exchanging labels. VRE 340A may be the operative VRE, and may perform these functions on behalf of router 12A.

VRE 340A maintains a routing information base (RIB) 342A to reflect the current topology of a network and other network entities to which router 12A is connected. Protocols 343A may include one or more routing protocols that allow router 12A to communicate with peer routers to exchange routing information and periodically update the RIB 342A based on the exchanged routing information to accurately reflect the topology of the network and the other network entities.

In accordance with RIB 342A, the forwarding component 18 maintains a forwarding information base (FIB) (not shown in FIGS. 3A-3C; see e.g., FIG. 2, block 24) that associates network destinations with specific next hops. VRE 340A typically processes RIB 342A information to perform route selection and generate the FIB based on selected routes. In this way, routes as well as labeling information can be programmed into the forwarding component of the router (see e.g. FIG. 2, block 18). VRE 340A may generate the FIB in the form of a radix tree having leaf nodes that represent destinations within the network. When forwarding a packet, the forwarding component traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface.

In response to receiving an in-service configuration update (ISCU) request from, for example, a user or administrator 350 via user interface 331, the MVM 330 initiates a configuration update by launching an ISCU manager 332 ("ISCU MGR 332") module to control the update process. In another aspect, an ISCU request may be scheduled or preprogrammed to occur without user or administrator involvement. In the example of FIGS. 3A-3B, the ISCU manager 332 maintains an ISCU state machine 333 ("ISCU state 333") to maintain state data 334 associated with VRE 340A. Thus, during the update process, MVM 330 manages the state data 334 for VRE 340A. In this manner, the virtual machine that manages replication of the state data 334 during the update process is a virtual machine other than the one being updated.

In response to receiving the ISCU request, the ISCU manager 332 also issues calls to the hypervisor 320 to cause hypervisor 320 to create a new virtual machine, VRE 340B, as shown in FIG. 3B. MVM 330 may establish a communication channel through the VMCI between VMCI 335 of MVM 330 and VMCI module 345B ("VMCI 345B") of VRE 340B. On VRE 340B, MVM 330 loads a disk image of a new operating system 341B. For example, if OS 341A on VRE 340A is a first version of an operating system, then OS 341B of VRE 340B may be an updated version of the first version of the operating system, an entirely new version of the operating system, or an entirely different operating system altogether.

Techniques of the present disclosure include ISCU manager 332 loading OS 341B by copying a disk image of the new operating system to the newly created VRE 340B instead of installing an update package onto an existing routing engine already in use. Update packages may be more prone to cause system malfunction. The ISCU manager 332 of the MVM 330 initiates the copying of the new software to VRE 340B, which may provide a stable upgrade process. The techniques of this disclosure for copying a disk image onto a newly created virtual machine may be less computationally expensive than reconfiguring an already running version of an operating system.

After loading the new version of the operating system (OS 341B) onto VRE 340B, MVM 330 transfers state data 334 of VRE 340A to VRE 340B. MVM 330 may accomplish the transfer of state data 334 by sending an interface ("IF") state chain to VRE 340B. For purposes of this disclosure the term IF state chain is intended to refer generically to any list, log, or other data structure that can be used to recreate state data. The state data recreated may relate to interfacing devices, routes, next hops, firewalls, filters or any other device or information for which a FIB may maintain an entry. Based on the IF state chain, VRE 340B recreates the state data 334 of VRE 340A. VRE 340B also replicates the protocols 343B and RIB 342B maintained by VRE 340A. The IF sate chain can be a temporal chain for recording entries to a FIB (not shown in FIGS. 3A-3C; see e.g., FIG. 2, block 24). When an entry to the FIB is created, a stub pointer can be added to the tail of the IF state chain to link an entry in the IF state chain to an entry in the FIB. The IF state chain enables MVM 330 to replay the creation of entries of the FIB to VRE 340B to enable the recreation of state data.

After VRE 340B replicates protocols 343A and RIB 342A of VRE 340A, as protocols 343B and RIB 342B, MVM 330 transfers control of the routing session from VRE 340A to VRE 340B. Router 12A may reduce the impact of switching control of the routing session from VRE 340A to VRE 340B by supporting "non-stop forwarding," which refers to the ability of the router's forwarding component (FIG. 2, block 18) to continue forwarding packets while simultaneously reestablishing a routing session. In some aspects, upon instantiating VRE 340B to begin an in-service configuration update, ISCU manager 332 may invoke a routing protocol of protocols 343A or 343B to inform neighboring routers 12 of certain new capabilities that router 12A supports during the switchover, such as graceful restart and non-stop forwarding. In addition, when switchover to VRE 340B concludes and VRE 340A is taken down, ISCU manager 332 may invoke a routing protocol of protocols 343B to indicate to neighboring routers 12 that router 12A no longer supports the capabilities.

Redundant virtual routing engines, such as VRE 340A and VRE 340B, can maintain forwarding state information during switchover, enabling the router to continue forwarding packets over routes that were available in the network's last-known state. Concurrently, to the extent necessary, VRE 340B can learn the network topology by receiving routing protocol updates from neighboring routers and calculate its routing information and forwarding information. As a result, impact on current packet flows through the network may be reduced.

Router 12A may reduce the impact of switching control of the routing session from VRE 340A to VRE 340B by supporting "graceful restart," which refers to the capability of preserving forwarding information while restarting a routing communication session, e.g., a BGP session. When establishing a routing communication session, a router that supports graceful restart advertises the capability to neighboring routers and specifies a restart time. The restart time reflects the estimated amount of time that it will take for the router to reestablish the routing communication session after failure of the previous session and may be, for example, approximately 120 seconds. Upon failure of the routing communication session, which may be caused by the switchover from VRE 340A to VRE 340B, other routers 12B-12F in the network 10 preserve forwarding information based on the expectation that the failed router will reestablish the routing communication session shortly. Having received the router's advertisement of graceful restart capabilities, a surviving router will maintain the failed router within a forwarding path of the surviving router in the event of a failure of the routing communication session. Likewise, the failed router preserves forwarding information in a state that existed prior to the failure. Consequently, the surviving router does not need to find alternative routes unless the failed router does not reestablish the routing communication session within the advertised restart time. As a result, routing instability caused by routing flaps within the network (i.e., routers advertising a destination on a network as being unavailable, and shortly thereafter, advertising the destination as available again) may be reduced.

Once VRE 340B has taken control of the routing session, MVM 330 causes VRE 340A to be shut down, as shown in FIG. 3C. VRE 340B operates as the primary routing engine for router 12A in a manner similar to that of VRE 340A prior to the ISCU request, but with an upgraded software program. In this manner, by invoking a second virtual machine to carry out the update, router 12A processes an in-service configuration update using a single hardware platform. The techniques described in this disclosure function without requiring multiple hardware platforms. Rather, an in-service configuration update may be performed by employing multiple virtual machines that run on a common underlying hardware platform. Although FIG. 3C does not show MVM 330 maintaining state data for VRE 340B, it is contemplated that during normal operation of router 12A, state data may be maintained by MVM 330, by the virtual machine controlling the routing session, or both.

Figure 4:
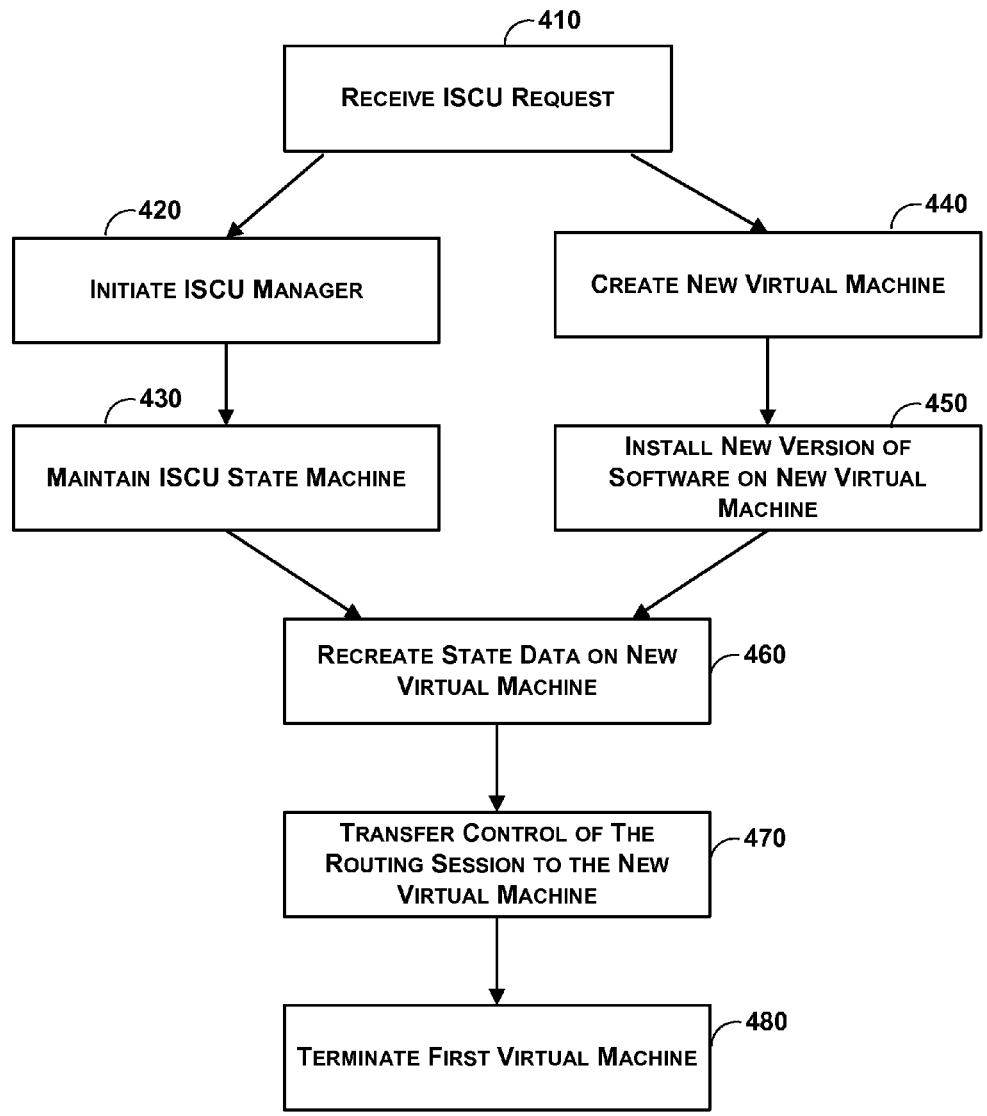
FIG. 4 is a flowchart illustrating techniques of the present disclosure.

FIG. 4 is a flowchart illustrating example operation of the router 12A of FIGS. 2 and 3A-3C. A routing device, such as a router 12A, is configured to run a plurality of virtual machines 330, 340 through a hypervisor 320 running on top of a kernel 310. The plurality of virtual machines 330, 340 communicate with one another through a communication backbone 360. The plurality of virtual machines 330, 340 comprise a managing virtual machine (MVM) 330 and a first virtual routing engine (VRE) 340A. VRE 340A runs a first operating system (OS) 341A. VRE 340A implements one or more routing protocols 343A to establish at least one routing communication session with neighboring routers in order to exchange capability information as well as routing information. VRE 340A also analyzes routing information stored in a routing information base (RIB) 342A and generates forwarding information 24 for a forwarding component 18 of the routing device 12A. The forwarding component 18 forwards network traffic via communication links 28 in accordance with the forwarding information 24 generated by VRE 340A. Forwarding information 24 may associate, for example, network destinations with specific next hops.

A configuration update procedure is initialized when the managing virtual machine (MVM) 330 of router 12A receives an in-service configuration update request (block 410), e.g., from administrator 350 via user interface 331. In response to receiving the in-service configuration update request, MVM 330 causes an ISCU manager 332 ("ISCU MGR 332") to be initiated on the MVM 330 (block 420). The ISCU manager 332 maintains an ISCU state machine 333 ("ISCU state 333") for maintaining state data 334 associated with VRE 340A (block 430). In response to receiving the ISCU request (block 410), the MVM 330 issues a call to the hypervisor 320 to create a new virtual machine, VRE 340B (block 440). The MVM 330 loads an updated version of the software onto the newly created virtual machine by copying a disk image from either memory 302 or another external source (block 450). After loading the new the new software, MVM 330 transfers state data 334 to VRE 340B (block 460). MVM 330 may, for example, send an IF state chain to the new virtual machine so that the new virtual machine can recreate the state data 334 of the first virtual machine based on the IF state chain. After transferring the state data 334 to VRE 340B, MVM 330 transfers control of the routing session from the VRE 340A to VRE 340B (block 470). In order to reduce the impact a switchover from VRE 340A to VRE 340B may have on the network 10, the router 12A can be configured to support techniques of non-stop forwarding and graceful restart, and may send a routing protocol capability advertisement messages during the upgrade process that informs neighboring routers 12 of non-stop forwarding and graceful restart capabilities of router 12A. Once VRE 340B has taken control of the routing session, the MVM 330 terminates VRE 340A (block 480).

In the example described above with reference to FIGS. 3A-C, a separate MVM 330 is implemented in the routing component 16 of router 12A to control the ISCU process, including requesting initialization of the second virtual machine, installing a new software system on the second virtual machine, and replicating state data from the first virtual machine to the second virtual machine. In the above example, the MVM may operate as a master virtual machine and the first and second virtual machines may operate as slave virtual machines. The MVM may comprise a host operating system used to manage guest operating systems executed on the first and second virtual machines. In this way, the ISCU processing code may only be included in the host operating system on the MVM, and not in the operating systems on the first and second virtual machines.

In another example, described in more detail below, the ISCU process may be performed between a first virtual machine and a second virtual machine without a MVM. More specifically, a first virtual machine in the routing component 16 of router 12A may control the ISCU process, including requesting initialization of the second virtual machine, installing a new software system on the second virtual machine, and replicating state data from the first virtual machine to the second virtual machine. In this example, the first virtual machine may operate as a master virtual machine and the second virtual machine may operate as a slave virtual machine that synchronizes with the master virtual machine. In this case, the ISCU processing code may be included in the operating systems on the first and second virtual machines, rendering an MVM with a host operating system unnecessary.

In either case, the techniques described in this disclosure enable an ISCU process to be performed on routers without redundant or dual routing hardware. In addition, the techniques enable a router to simultaneously install a software update, maintain a routing session, and forward incoming packets. For example, during a switchover from the first virtual machine to the second virtual machine, the router may support non-stop forwarding to continue forwarding incoming packets. During a switchover, the router may also support graceful restart, and may advertise its capabilities to other routers in the network to avoid a premature tear down of the routing session.

The technique described above, in which the MVM controls the ISCU process, may provide several additional advantages, including reducing complexity by keeping management of the ISCU process separate from the virtual machine being updated and providing efficient state replication between the first virtual machine and the second virtual machine. The technique described in more detail below, in which the first virtual machine controls the ISCU process, may also provide additional advantages, including performing the ISCU process with fewer changes to the operating systems executed on the first and second virtual machines and without an external orchestrator executing a host operating system.

Figure 5A:
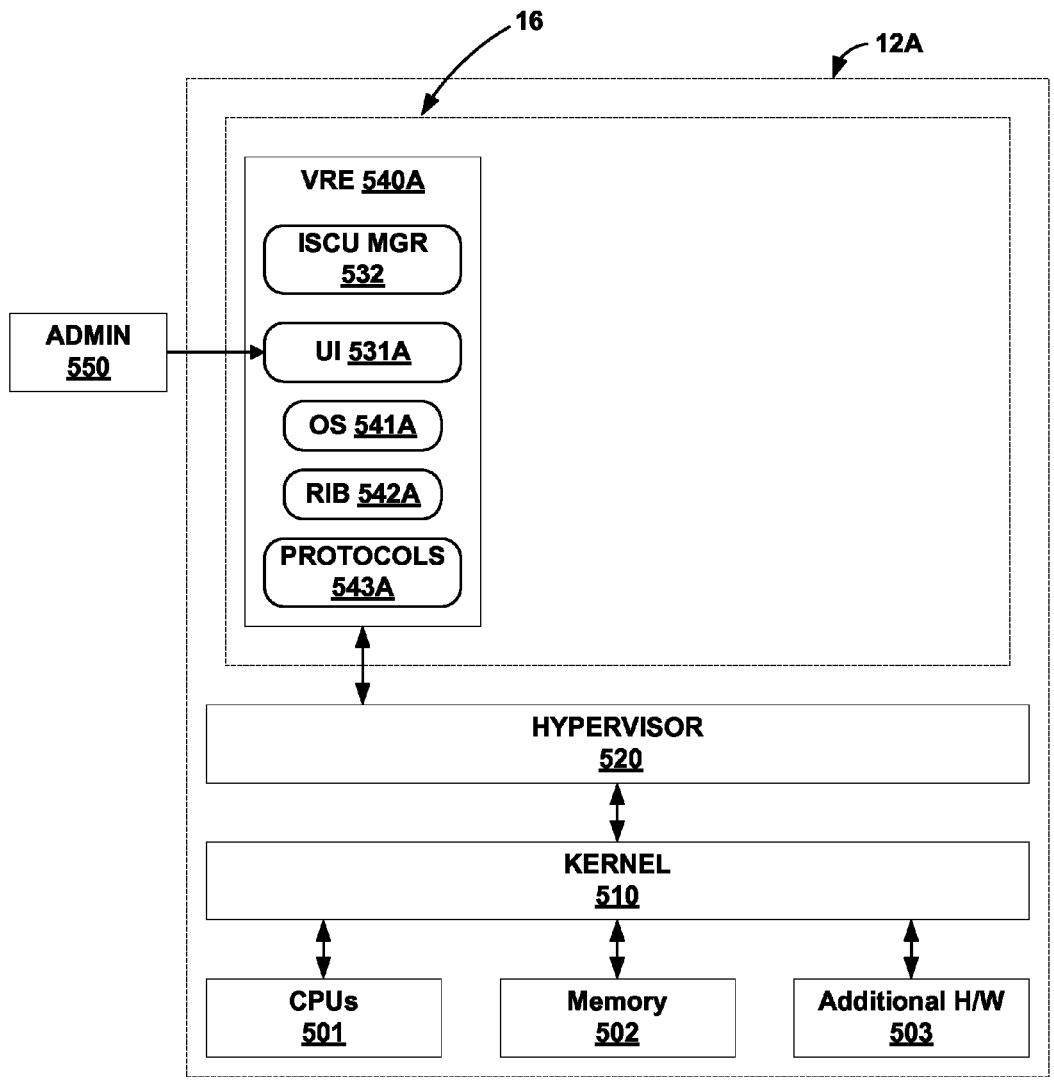
FIGS. 5A-5C are block diagrams showing various hardware components and software processes of an exemplary router at different stages of an in-service configuration update controlled by a first virtual machine.
Figure 5B:
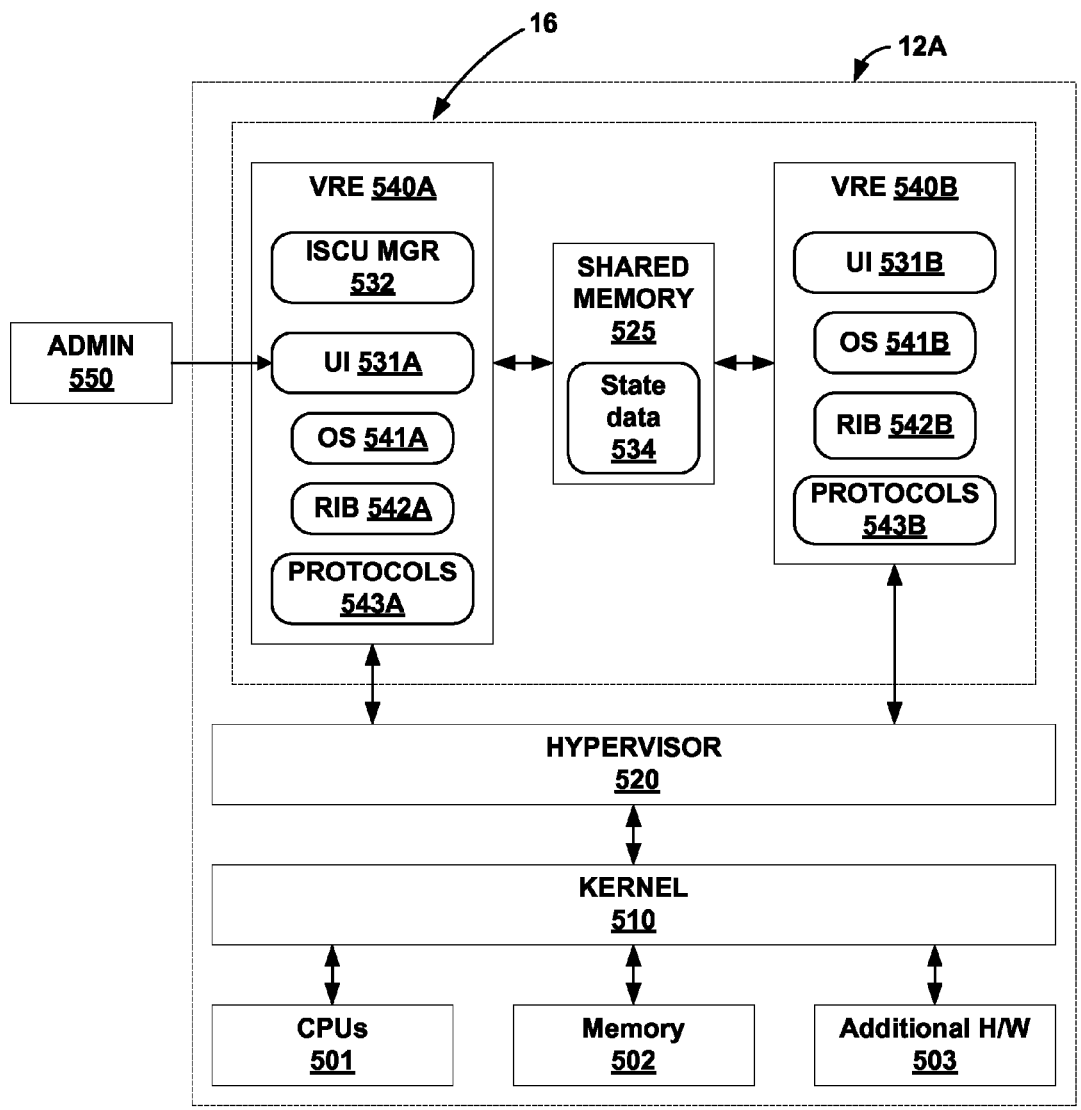
Figure 5C:
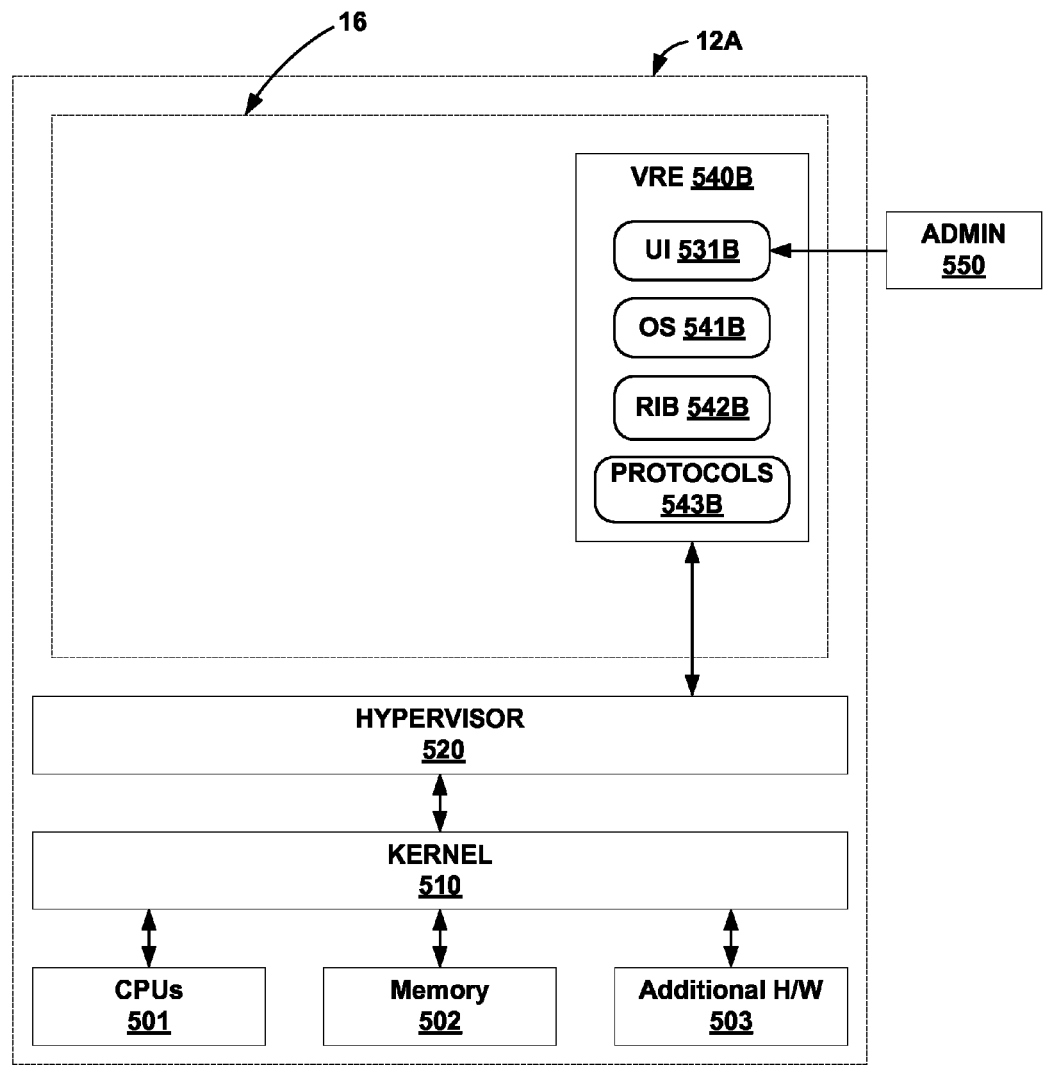

FIGS. 5A-5C are block diagrams showing various hardware components and software processes of another example of router 12A shown in FIG. 2, at different stages of an in-service configuration update controlled by a first virtual machine 540A. FIG. 5A shows router 12A comprising a first virtual machine VRE 540A configured to control a routing session and an in-service configuration update (ISCU). FIG. 5B shows router 12A while the ISCU is in progress comprising first virtual machine VRE 540A and a second virtual machine VRE 540B. First VRE 540A may, for example, control a routing session while upgraded software is loaded on to VRE 540B to perform the ISCU. FIG. 5C shows router 12A after the in-service configuration update is completed, comprising only VRE 540B. After the upgraded software is loaded onto VRE 540B and control of the routing session has been transferred from VRE 540A to VRE 540B, VRE 540A may be shut down.

Block 16 of FIGS. 5A-5C comprises the functionality described in relation to the routing component 16 of FIG. 2. The router 12A comprises one or more central processing units (CPUs) 501 configured to execute instructions fetched from memory 502. Memory 502 may comprise one or more computer-readable media, such as a non-transitory, computer-readable storage media. Examples of such media include RAM, ROM, NVRAM, EEPROM, flash memory, and other computer-readable storage media. The router 12A further comprises additional hardware 503 ("additional H/W 503") such as discrete hardware circuitry, ASICS, and input/output devices. A kernel 510 of an operating system manages the physical resources of the router 12A, including CPUs 501, memory 502 and/or additional hardware 503. The forwarding component 18, described in relation to FIG. 2, for example, may be either fully or partially incorporated into the additional hardware 503 of FIGS. 5A-5C.

Through a hypervisor 520 running on top of a kernel 510, router 12A has the capability to concurrently run a plurality of virtual machines 540A-540B, each with its own unique operating system. The hypervisor 520 may, for example, be a proprietary program such as VMWARE® or an open source solution. As shown in FIG. 5B, the plurality of virtual machines may include a first virtual machine VRE 540A and a second virtual machine VRE 540B. First VRE 540A may have a master/slave relationship with second VRE 540B and have access privileges to second VRE 540B. First VRE 540A may be designated as the master virtual machine by its configuration upon start-up by hypervisor 520. Similarly, second VRE 540B may be designated as the slave virtual machine by its configuration upon start-up by hypervisor 520. As the slave virtual machine, second VRE 540B may continually synchronize with first VRE 540A. In the illustrated example of FIG. 5B, second VRE 540B may synchronize with first VRE 540A via shared memory 525. In other examples, virtual machines 540A and 540B may communicate with one another through a communication backbone, such as LIBVIRT. In any case, hypervisor 520 may control the communication between virtual machines 540A and 540B.

Users may directly access virtual machine VRE 540A by logging into VRE 540A, and directly access virtual machine VRE 540B by logging into VRE 540B. When in control of the routing session, as illustrated in FIGS. 5A-5B, first VRE 540A may receive input from an administrator 550 through a user interface (UI) 531A. After a switchover when second VRE 540B is in control of the routing session, as illustrated in FIG. 5C, second VRE 540B may receive input from an administrator 550 through a UI 531B.

In the example of FIG. 5A, first VRE 540A runs a first operating system (OS) 541A, such as a version of a network operating system. First VRE 540A provides an operating environment for execution of protocols 543A. Protocols 543A may include, for example, routing protocols, tunneling protocols, and label switching protocols, such as BGP, IS-IS, RSVP-TE and LDP, or other protocols. Router 12A uses protocols 543A to perform a variety of functions, such as to exchange routing information, to establish VPNs or LSPs, and for exchanging labels. First VRE 540A may be the master or operative VRE, and may perform these functions on behalf of router 12A.

First VRE 540A maintains a routing information base (RIB) 542A to reflect the current topology of a network and other network entities to which router 12A is connected. Protocols 543A may include one or more routing protocols that allow router 12A to communicate with peer routers to exchange routing information and periodically update the RIB 542A based on the exchanged routing information to accurately reflect the topology of the network and the other network entities.

In accordance with RIB 542A, the forwarding component 18 maintains a forwarding information base (FIB) (not shown in FIG. 5A; see e.g., FIG. 2, block 24) that associates network destinations with specific next hops. VRE 540A typically processes information from RIB 542A to perform route selection and generate the FIB based on selected routes. In this way, routes as well as labeling information may be programmed into the forwarding component of the router (see e.g. FIG. 2, block 18). VRE 540A may generate the FIB in the form of a radix tree having leaf nodes that represent destinations within the network. When forwarding a packet, the forwarding component traverses the radix tree to a leaf node based on information within a header of the packet to ultimately select a next hop and output interface to which to forward the packet. Based on the selection, the forwarding component may output the packet directly to the output interface or, in the case of a multi-stage switch fabric of a high-end router, may forward the packet to subsequent stages for switching to the proper output interface.

In response to receiving an ISCU request from, for example, a user or administrator 550 via user interface 531A, first VRE 540A initiates a configuration update by launching an ISCU manager 532 ("ISCU MGR 532") to control the update process. In another aspect, an ISCU request may be scheduled or preprogrammed to occur without user or administrator involvement. In the example of FIG. 5B, ISCU manager 532 included in first VRE 540A may store state data 534 associated with VRE 540A in shared memory 525. In this manner, during the update process, first VRE 540A may manage replication of state data 534 from first VRE 540A to second VRE 540B via shared memory 525. During normal operation of router 12A, first VRE 540A may maintain state data within first VRE 540A.

In response to receiving the ISCU request, ISCU manager 532 requests hypervisor 520 to create a new virtual machine, second VRE 540B, as shown in FIG. 5B. In this example, hypervisor 520 may configure second VRE 540B to operate as a slave virtual machine to first VRE 540A. Once second VRE 540B is created, ISCU manager 532 requests hypervisor 520 to load a disk image of a new operating system 541B. For example, if OS 541A on first VRE 540A is a first version of an operating system, then OS 541B of second VRE 540B may be an updated version of the first version of the operating system, an entirely new version of the operating system, or an entirely different operating system altogether.

ISCU manager 532 may request hypervisor 520 to load OS 541B by copying a disk image of the new operating system to the newly created second VRE 540B instead of installing an update package to existing virtual machine first VRE 540A already in use. Update packages may be more prone to cause system malfunction. ISCU manager 532 in first VRE 540 may initiate the copying of the new software to second VRE 540B via hypervisor 520, which may provide a stable upgrade process. For example, hypervisor 520 may copy a disk image of the new operating system from either memory 302 or another external source. The techniques of this disclosure for copying a disk image onto a newly created virtual machine may be less computationally expensive than reconfiguring an already running version of an operating system.

After loading the new version of the operating system, OS 541B, onto second VRE 540B, ISCU manager 532 transfers state data 534 of first VRE 540A to second VRE 540B via shared memory 525. First VRE 540A may accomplish the transfer of state data 534 by sending an interface ("IF") state chain from shared memory 525 to second VRE 540B. For purposes of this disclosure the term IF state chain is intended to refer generically to any list, log, or other data structure that may be used to recreate state data. The state data recreated may relate to interfacing devices, routes, next hops, firewalls, filters or any other device or information for which a FIB may maintain an entry. Based on the IF state chain, second VRE 540B recreates the state data of first VRE 540A. The IF state chain may be a temporal chain for recording entries to a FIB (not shown in FIG. 5B; see e.g., FIG. 2, block 24). When an entry to the FIB is created, a stub pointer may be added to the tail of the IF state chain to link an entry in the IF state chain to an entry in the FIB. The IF state chain enables first VRE 540A to replay the creation of entries of the FIB to second VRE 540B to enable the recreation of state data. After state replication, second VRE 540B may maintain its own state data within second VRE 540B.

Second VRE 540B, as the slave virtual machine, synchronizes with first VRE 540A to replicate protocols 543A and RIB 542A maintained by first VRE 540A as protocols 543B and RIB 542B. After second VRE 540B replicates state 534, protocols 543A and RIB 542A of first VRE 540A, ISCU manager 532 transfers control of the routing session from first VRE 540A to second VRE 354B via hypervisor 520. After the switchover, second VRE 540B becomes the master virtual machine and assumes control of the routing session for router 12A.

Router 12A may reduce the impact of switching control of the routing session from first VRE 540A to second VRE 540B by supporting "non-stop forwarding," which refers to the ability of the router's forwarding component (FIG. 2, block 18) to continue forwarding packets while simultaneously reestablishing a routing session. In some aspects, when ISCU manager 532 requests hypervisor 520 to instantiate second VRE 540B to begin an in-service configuration update, first VRE 540A may invoke a routing protocol of protocols 543A to inform neighboring routers 12 of certain new capabilities that router 12A supports during the switchover, such as graceful restart and non-stop forwarding. In addition, when switchover to second VRE 540B concludes and first VRE 540A is taken down, second VRE 540B may invoke a routing protocol of protocols 343B to indicate to neighboring routers 12 that router 12A no longer supports the capabilities.

Redundant virtual routing engines, such as first VRE 540A and second VRE 540B, may maintain forwarding state information during a switchover, enabling router 12A to continue forwarding packets over routes that were available in the last-known state of the network. During the switchover, hypervisor 520 may manage communication and control for distributed packet forwarding devices, e.g., IFCs, (not shown) within router 12A according to the last-known state maintained by first VRE 540A. Concurrently during switchover, second VRE 540B may learn the network topology by receiving routing protocol updates from neighboring routers and calculate its routing information and forwarding information. After the switchover, second VRE 540B may assume control of the forwarding process according to the last-known state replicated from first VRE 540A or according to a more recently learned state from the routing protocol updates. As a result, impact on current packet flows through the network during a switchover may be reduced.

Router 12A may reduce the impact of switching control of the routing session from first VRE 540A to second VRE 540B by supporting "graceful restart," which refers to the capability of preserving forwarding information while restarting a routing communication session, e.g., a BGP session. When establishing a routing communication session, router 12 A may advertise its graceful restart capability to neighboring routers and specify a restart time. The restart time reflects the estimated amount of time that it will take for router 12A to reestablish the routing communication session after failure of the previous session and may be, for example, approximately 120 seconds.

Upon failure of the routing communication session, which may be caused by the switchover from first VRE 540A to second VRE 540B, other routers 12B-12F in the network 10 preserve forwarding information based on the expectation that failed router 12A will reestablish the routing communication session shortly. Having received the advertisement of graceful restart capabilities from router 12A, one or more of surviving routers 12 will maintain failed router 12A within a forwarding path of the surviving router in the event of a failure of the routing communication session. Likewise, failed router 12A preserves forwarding information in a state that existed prior to the failure within one or both of first VRE 540A and second VRE 540B. Consequently, surviving routers 12 do not need to find alternative routes unless failed router 12A does not reestablish the routing communication session within the advertised restart time. As a result, routing instability caused by routing flaps within the network (i.e., routers advertising a destination on a network as being unavailable, and shortly thereafter, advertising the destination as available again) may be reduced.

Once second VRE 540B has taken control of the routing session, hypervisor 520 causes first VRE 540A to be shut down, as shown in FIG. 5C. Second VRE 540B operates as the master or primary routing engine for router 12A in a manner similar to that of first VRE 540A prior to the ISCU request, but with an upgraded operating system OS 541B. In other examples, first VRE 540A may be re-initiated by hypervisor 520 and loaded with the new version of the operating system. First VRE 540A may be initiated and updated in a substantially similar manner as the ISCU process described above, except in this case second VRE 540B may control the ISCU process. For example, second VRE 540B may launch an ISCU manager (not shown) and request hypervisor 520 to re-initiate first VRE 540A and load an updated operating system OS 541A onto first VRE 540A, which is the same version as OS 541B on second VRE 540B. In this example, hypervisor 520 would configure first VRE 540A to operate as the slave or back-up virtual machine to second VRE 540B.

By invoking a second virtual machine to carry out the update, router 12A processes an in-service configuration update using a single routing hardware platform. The techniques described in this disclosure function without requiring multiple routing hardware platforms. Rather, an in-service configuration update may be performed by employing multiple virtual machines that run on a common underlying hardware platform. Additionally, performing ISCU within a single routing component 16 using a virtual machine switchover may be less disruptive than switching between two separate routing hardware platforms. Specifically, the virtual machine switchover is less disruptive from the perspective of distributed packet forwarding devices, e.g., IFCs, (not shown) because there is no switchover of the routing hardware platform. In the case of a virtual machine switchover, the distributed packet forwarding devices observe no change and control over the routing session may pass cleanly from first VRE 540A to second VRE 540B.

Before, during, and after the ISCU process, router 12A may use keep-alive or heartbeat mechanisms to monitor the health of first VRE 540A and/or VRE 540B. More specifically, the heartbeat mechanisms may detect a failure of one or both of the virtual machines 540A-540B. If a failure is detected on the master or primary virtual machine, hypervisor 520 may switch control of the routing session to the slave or stand-by virtual machine. In this way, first VRE 540A and second VRE 540B may be used to provide high availability (HA) for software failures on router 12A. In this case, both first VRE 540A and second VRE 540B run the same version of operating system, OS 541A and OS 541B, respectively. As an example, first VRE 540A may operate as a primary virtual machine and second VRE 540B may operate as a back-up or stand-by virtual machine. If a failure is detected in first VRE 540A, hypervisor 520 may switch control of the routing session from first VRE 540A to second VRE 540B. The switchover for HA may be performed in substantially the same manner as the switchover described above for ISCU. After the switchover, second VRE 540A may become the primary virtual machine and first VRE 540A may be shut down. In some cases, first VRE 540A may be re-initiated with the same operating system as second VRE 540B to operate as the back-up or stand-by virtual machine for second VRE 540B.

Figure 6:
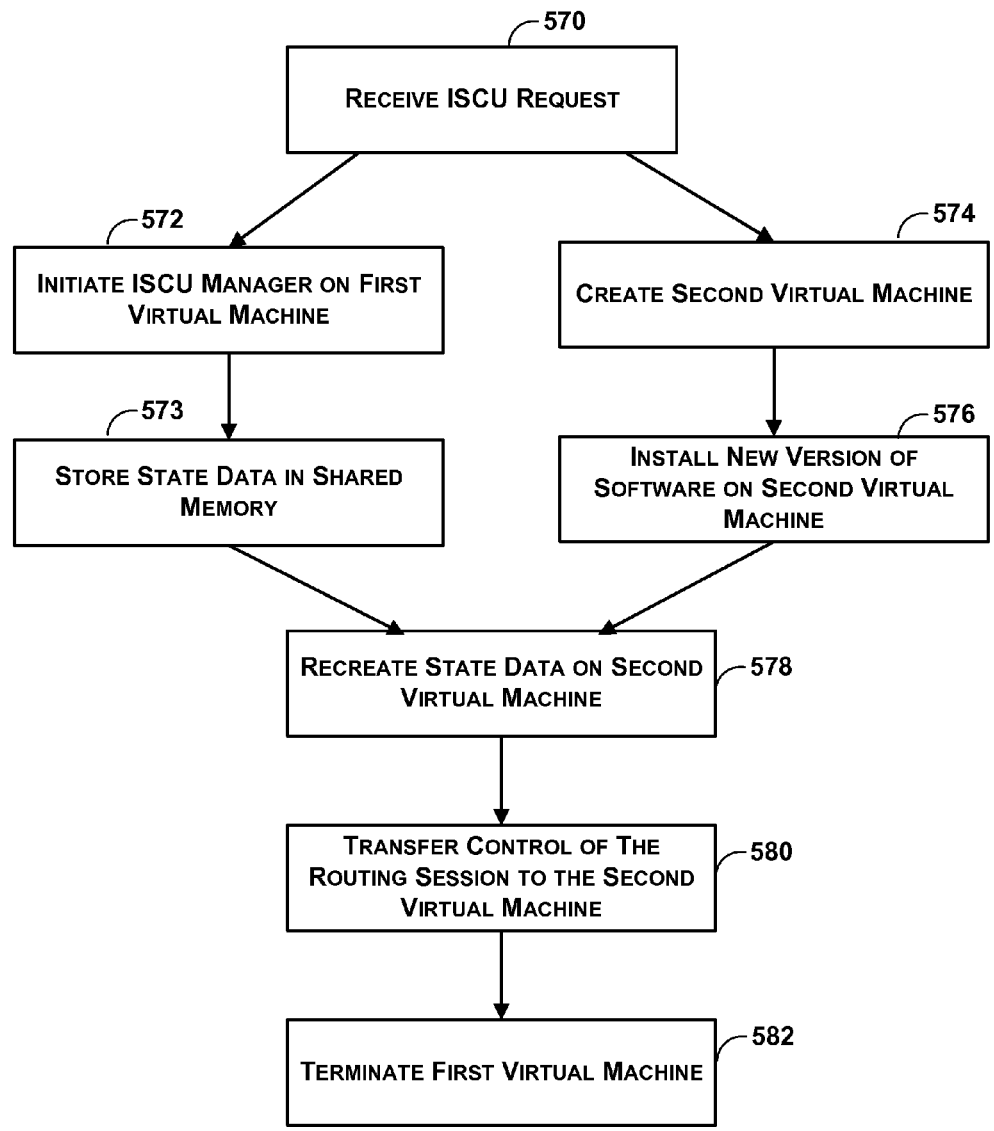
FIG. 6 is a flowchart illustrating an example operation a router during an in-service configuration update controlled by a first virtual machine.

FIG. 6 is a flowchart illustrating an example operation of the router 12A of FIGS. 2 and 5A-5C performing an ISCU controlled by first VRE 540A. A routing device, such as a router 12A, is configured to run a plurality of virtual machines 540A-540B through a hypervisor 520 running on top of a kernel 510. The plurality of virtual machines 540A-540B comprise first VRE 540A and second VRE 540B. First VRE 540A runs a first OS 541A. First VRE 540A implements one or more routing protocols 543A to establish at least one routing communication session with neighboring routers in order to exchange capability information as well as routing information. First VRE 540A also analyzes routing information stored in a RIB 542A and generates forwarding information 24 for a forwarding component 18 of the routing device 12A.

An in-service configuration update procedure is initialized when the first VRE 540A of router 12A receives an ISCU request (block 570), e.g., from administrator 550 via user interface 531A. In response to receiving the ISCU request, first VRE 540A initiates an ISCU manager 532 on first VRE 540A (block 572). The ISCU manager 532 stores state data 534 associated with first VRE 540A in shared memory 525 (block 573). Also in response to receiving the ISCU request (block 570), ISCU manager 532 requests hypervisor 520 to create a new virtual machine, second VRE 540B (block 574). ISCU manager 532 installs a new version of the operating system OS 531B onto the newly created virtual machine second VRE 540B via hypervisor 520 by copying a disk image from either memory 302 or another external source (block 574).

After loading the new software, ISCU manager 532 transfers state data 534 from first VRE 540A to second VRE 540B via shared memory 525 to recreate the state data on second VRE 540B (block 578). ISCU manager 532 may send, for example, an IF state chain to the new virtual machine second VRE 540B so that second VRE 540B may recreate the state data 534 of first VRE 540A based on the IF state chain. After transferring state data 534 to second VRE 540B, ISCU manager 532 transfers control of the routing session from first VRE 540A to second VRE 540B via hypervisor 520 (block 580). In order to reduce the impact a switchover from first VRE 540A to second VRE 540B may have on the network 10, the router 12A may be configured to support techniques of non-stop forwarding and graceful restart, and may send a routing protocol capability advertisement messages during the upgrade process that informs neighboring routers 12 of non-stop forwarding and graceful restart capabilities of router 12A. Once second VRE 540B has taken control of the routing session, hypervisor 520 terminates first VRE 540A (block 582).

In the above examples, the techniques for in-service configuration updates using virtual machines are described as being performed within a physical device, e.g., router 12A included in a physical network 10. In other examples, the techniques may be performed within a virtual device included in a virtual network. A virtual network or modeled network may be used to conduct testing of the disclosed ISCU techniques and other techniques within a virtual device prior to implementation within a physical device. The virtual network may be constructed to model certain network conditions in order to test how the disclosed ISCU techniques or other techniques within a network device may react. Moreover, the virtual device may be construed to test how the disclosed ISCU techniques or other techniques react during different device failures, e.g., software and hardware failures. In some example, the virtual network and/or virtual device may also be used for teaching purposes.

Various examples of the invention have been described. These and other examples are within the scope of the following claims.

The invention claimed is:

1. A method comprising:
a routing component of a network device, running a first virtual machine executing a first operating system that controls a routing communication session between the network device and a second network device, and controls an in-service configuration update (ISCU) of the routing component;
in response to receiving an ISCU request with the first virtual machine to update the first operating system for the routing component, initializing a second virtual machine on the routing component of the network device;
installing a second operating system on the second virtual machine running on the routing component of the network device, wherein the second operating system is different than the first operating system;
transferring control of the routing communication session from the first operating system on the first virtual machine to the second operating system on the second virtual machine running on the routing component of the network device while continuing to forward data packets from the network device to the second network device; and
after transferring control of the routing communication session to the second operating system on the second virtual machine, shutting down the first virtual machine.

2. The method of claim 1, wherein the first operating system comprises a first version of an operating system for the network device and the second operating system comprises a second version of the same operating system.

3. The method of claim 1, wherein the first virtual machine comprises a master virtual machine and the second virtual machine comprises a slave virtual machine that synchronizes with the master virtual machine.

4. The method of claim 1, further comprising, in response to receiving the ISCU request with the first virtual machine, storing state date of the first virtual machine associated with the routing communication session in a shared memory, wherein the shared memory is shared between the first virtual machine and the second virtual machine.

5. The method of claim 1, wherein transferring control of the routing communication session from the first operating system on the first virtual machine to the second operating system on the second virtual machine comprises loading state data of the first virtual machine associated with the routing communication session onto the second virtual machine.

6. The method of claim 1, wherein transferring control of the routing communication session comprises performing a graceful restart operation.

7. The method of claim 1, further comprising:
re-initializing the first virtual machine on the routing component of the network device; and
installing the second operating system on the first virtual machine running on the routing component of the network device, wherein the second virtual machine comprises a master virtual machine and the first virtual machine comprises a slave virtual machine that synchronizes with the master virtual machine.

8. The method of claim 1, further comprising, in response to receiving the ISCU request with the first virtual machine, advertising capability information to the second network device.

9. The method of claim 8, wherein the capability information indicates that the network device supports graceful restart.

10. The method of claim 8, wherein the capability information indicates that the network device supports non-stop forwarding.

11. A network device comprising at least one processor configured to operate as:
a routing component;
a first virtual machine running on the routing component, wherein the first virtual machine is configured to execute a first operating system, wherein the first operating system controls a communication session between the network device and a second network device, and controls an in-service configuration update (ISCU) of the routing component; and
a second virtual machine running on the routing component, wherein, in response to receiving an ISCU request with the first virtual machine to update the first operating system for the routing component, the first virtual machine requests initialization of the second virtual machine on the routing component of the network device, requests installation of a second operating system on the second virtual machine running on the routing component of the network device, wherein the second operating system is different than the first operating system, transfers control of the routing communication session from the first operating system on the first virtual machine to the second operating system on the second virtual machine running on the routing component of the network device while a forwarding component of the network device continues to forward data packets from the network device to the second network device, and requests shut down of the first virtual machine after control of the routing communication session is transferred to the second operating system on the second virtual machine.

12. The network device of claim 11, wherein the first operating system comprises a first version of an operating system for the network device and the second operating system comprises a second version of the same operating system.

13. The network device of claim 11, wherein the first virtual machine comprises a master virtual machine and the second virtual machine comprises a slave virtual machine that synchronizes with the master virtual machine.

14. The network device of claim 11, further comprising a shared memory shared between the first virtual machine and the second virtual machine, wherein, in response to receiving the ISCU request, the processor configured to operate as the first virtual machine stores state date of the first virtual machine associated with the routing communication session in the shared memory.

15. The network device of claim 11, wherein the processor configured to operate as the first virtual machine transfers control of the routing communication session by loading state data of the first virtual machine associated with the routing communication session onto the second virtual machine.

16. The network device of claim 11, wherein the processor configured to operate as the first virtual machine transfers control of the routing communication session by performing a graceful restart operation.

17. The network device of claim 11, wherein the at least one processor is further configured to operate as a hypervisor that runs the first virtual machine and the second virtual machine on the routing component of the network device.

18. The network device of claim 17, wherein, in response to the requests from the first virtual machine, the processor configured to operate as the hypervisor initializes the second virtual machine on the routing component of the network device, and installs the second operating system on the second virtual machine running on the routing component of the network device.

19. The network device of claim 17, wherein, in response to the request from the first virtual machine after control of the routing communication session is transferred to the second operating system on the second virtual machine, the processor configured to operate as the hypervisor shuts down the first virtual machine.

20. The network device of claim 11, wherein the processor configured to operate as the second virtual machine requests re-initialization of the first virtual machine on the routing component of the network device, and requests installation of the second operating system on the first virtual machine running on the routing component of the network device, wherein the second virtual machine comprises a master virtual machine and the first virtual machine comprises a slave virtual machine that synchronizes with the master virtual machine.

21. The network device of claim 11, wherein, in response to receiving the ISCU request, the processor configured to operate as the first virtual machine advertises capability information to the second network device.

22. The network device of claim 21, wherein the capability information indicates that the network device supports graceful restart.

23. The network device of claim 21, wherein the capability information indicates that the network device supports non-stop forwarding.

24. A non-transitory, computer-readable storage medium comprising instructions that cause one or more programmable processors to:
on a routing component of a network device, run a first virtual machine executing a first operating system that controls a routing communication session between the network device and a second network device, and controls an in-service configuration update (ISCU) of the routing component of the network device;
in response to receiving an ISCU request with the first virtual machine to update the first operating system for the routing component, initialize a second virtual machine on the routing component of the network device;
install a second operating system on the second virtual machine running on the routing component of the network device, wherein the second operating system is different than the first operating system;
transfer control of the routing communication session from the first operating system on the first virtual machine to the second operating system on the second virtual machine running on the routing component of the network device while continuing to forward data packets from the network device to the second network device; and
after transferring control of the routing communication session to the second operating system on the second virtual machine, shut down the first virtual machine.

* * * * *